United States Patent [19]

McEachern et al.

[11] Patent Number: 4,811,340
[45] Date of Patent: Mar. 7, 1989

[54] SYNCHRONIZATION OF ASYNCHRONOUS DATA SIGNALS

[75] Inventors: James A. McEachern; Wayne D. Grover, both of Edmonton, Canada

[73] Assignee: Northern Telecom Limited, Montreal, Canada

[21] Appl. No.: 876,134

[22] Filed: Jun. 19, 1986

[51] Int. Cl.$^4$ .............................................. H04J 3/07
[52] U.S. Cl. ..................................... 370/102; 375/118
[58] Field of Search ................. 375/118, 112; 370/102

[56] References Cited

U.S. PATENT DOCUMENTS

| | | | |
|---|---|---|---|
| 3,461,245 | 8/1969 | Johannes et al. | 370/102 |
| 3,872,257 | 3/1975 | Bleikardt et al. | 370/102 |
| 3,873,773 | 3/1975 | Guy, Jr. | 375/112 |
| 4,072,826 | 2/1978 | Aveneau | 370/102 |
| 4,086,436 | 4/1978 | Cohen et al. | 370/102 |
| 4,095,053 | 6/1978 | Duttweiler et al. | 370/102 |
| 4,347,620 | 8/1982 | Black et al. | 375/112 |
| 4,387,459 | 6/1983 | Huffman | 370/102 |
| 4,412,299 | 10/1983 | Huffman | 375/118 |
| 4,489,421 | 12/1984 | Burger | 375/112 |
| 4,514,855 | 4/1985 | Lang et al. | 375/118 |

FOREIGN PATENT DOCUMENTS 0035795 3/1981 European Pat. Off. .

Primary Examiner—Salvatore Cangialosi
Attorney, Agent, or Firm—R. John Haley

[57] ABSTRACT

In a synchronous network, asynchronous data signals are synchronized using positive/negative stuffing under the control of stuff request signals which are produced in dependence upon the phase difference between the asynchronous and synchronized data signals as compared to respective threshold values. The phase difference is, or the threshold values are, cyclically changed in a manner to produce additional stuffing, not necessitated by the asynchronous frequency difference, whereby the frequency of jitter, due to stuffing, in the synchronized data signal is increased. The increased frequency jitter is filtered out in an already-provided phase locked loop.

48 Claims, 6 Drawing Sheets

FIG. I
PRIOR ART

SYNCHRONIZATION OF ASYNCHRONOUS DATA SIGNALS

This invention relates to a method of and apparatus for synchronizing as asynchronous data signal to produce a synchronized data signal.

It has long been known to use stuffing techniques in order to produce a data signal, which is synchronized to a local clock frequency, from an incoming data signal which is asynchronous to the local clock frequency. The synchronized data signal can then conveniently be switched or transmitted with other, similarly synchronized, data signals.

The most frequently used stuffing technique is positive stuffing, in which it is assured that the frequency of the synchronized data signal is equal to or greater than the highest possible frequency of the asynchronous data signal, and frequency differences are made up by the insertion of stuff bits. For example, an asynchronous DS1 data signal has a frequency of 1.544Mb/s +/−75b/s, and may be converted by positive stuffing into a synchronized data signal with a frequency of at least 1.544075Mb/s. Generally, a higher frequency than this is used for the synchronized data signal in order to enable waiting time jitter, which arises as a result of the stuffing process and has a frequency component equal to the stuffing frequency, to be subsequently filtered out from the synchronized data signal.

Whilst this technique of positive stuffing has been effective for some time, it can not be readily used in a so-called synchronous transmission network in which incoming asynchronous and synchronous data signals must be accommodated, outgoing synchronized data signal having the same frequency as the incoming synchronous data signals. Synchronous networks, such as those using the so-called SYNTRAN and SONET formats, are becoming of increasing importance in the communication of data signals.

In a synchronous network, an incoming synchronous data signal is already synchronized to the correct frequency so that there is no need to provide a synchronizing arrangement for such a signal. An incoming asynchronous data signal, however, can have a frequency which is either lower or higher than the synchronized data signal frequency, and a synchronizing arrangement is required in order to effect positive or negative stuffing, respectively, to produce a synchronized data signal from the asynchronous data signal. Whereas positive stuffing comprises providing a stuff bit in the synchronized data signal to compensate for a relatively lower asynchronous data signal frequency, negative stuffing comprises using a 'spare' bit of the synchronized data signal for transmitting data to compensate for a relatively higher asynchronous data signal frequency.

With this positive/negative stuffing, the synchronized data signal has a waiting time jitter component at a frequency which is equal to the rate of positive or negative stuffing. The closer the asynchronous data signal frequency is to the synchronized data signal frequency, the lower will be the stuffing rate and hence the jitter component frequency, rendering it more difficult to filter out the jitter from the synchronized data signal. Using a phase-locked loop (PLL) to filter out jitter, the need to handle lower frequency jitter components results in the disadvantages of increased acquisition times and memory requirements.

Accordingly, the jitter produced by the conversion of an asynchronous data signal into a synchronized data signal at a nearby frequency presents a serious problem, which is of particular concern in synchronous transmission networks using positive/negative stuffing for accommodating asynchronous data signals. An object of this invention, therefore, is to provide an improved synchronizing method and apparatus in which this problem is reduced or substantially avoided.

According to one aspect of this invention there is provided a method of synchronizing an asynchronous signal to produce a synchronized signal by stuffing the asynchronous signal in dependence upon a stuff request signal produced from a comparison of phases of the asynchronous and synchronized signals, wherein the stuff request signal is produced with additional stuff requests thereby to change the frequency spectrum, in particular to increase the frequency, of jitter in the synchronized signal.

Thus in accordance with this invention, additional stuffing not necessitated by the frequency difference between the asynchronous and synchronized signals, is effected in order to effect a frequency-shift of the jitter which arises due to the stuffing process. More particularly, this frequency shift is towards a higher frequency, whereby the jitter component in the synchronized signal is filtered out by a dejittering phase locked loop in a receiver which ultimately receives the synchronized signal.

According to another aspect this invention provides a method of synchronizing an asynchronous data signal to produce a synchronized data signal comprising the steps of: stuffing the asynchronous data signal in dependence upon a stuff request signal to produce the synchronized data signal; producing the stuff request signal in dependence upon the relative phases of the asynchronous and synchronized data signals; and modifying the production of the stuff request signal to included additional stuff requests therein whereby the frequency of jitter, due to stuffing, in the synchronized data signal is increased. The relative phases of the asynchronous and synchronized data signals can, of course, be determined from the phases of clock signals related to the data signals, rather than directly from the data signals themselves.

Preferably the stuff request signal is produced in dependence upon the magnitude of a phase difference between the asynchronous and synchronized data signals in comparison to at least one threshold value, and the step of modifying the production of the stuff request signal comprises the step of changing at least one of said phase difference and said threshold value. As the phase difference is compared with the threshold value to produce the stuff request signal, it is a matter of convenience as to whether a signal representing the phase difference or the threshold value is changed. In any event, preferably the change is cyclical and periodical with a period, preferably not more than about 5ms to provide a minimum jitter component of about 200Hz, during which a plurality of stuffs of the asynchronous data signal can be effected.

According to a further aspect this invention provides a method of synchronizing an asynchronous data signal to produce a synchronized data signal comprising the steps of: stuffing the asynchronous data signal in dependence upon positive and negative stuff request signals to produce the synchronized data signal; producing the positive and negative stuff request signals in dependence upon the magnitude of a phase difference between the asynchronous and synchronized data signals in comparison to respective threshold values; and cyclically changing at least one of said phase difference and said threshold values thereby to produce additional stuff requests in the positive and negative stuff request signals, whereby the frequency of jitter, due to stuffing, in the synchronized data signal is increased.

The invention also extends to synchronizing apparatus comprising: means responsive to a stuff request signal for stuffing an asynchronous data signal to produce a synchronized data signal; means for producing the stuff request signal in dependence upon the relative phase of the asynchronous and synchronized data signals; and modifying means for modifying the production of the stuff request signal to include additional stuff requests thereby to increase the frequency of jitter, due to stuffing, in the synchronized data signal.

The invention further extends to synchronizing apparatus comprising: means responsive to positive and negative stuff request signals for stuffing an asynchronous data signal to produce a synchronized data signal; means for producing the positive and negative stuff request signals in dependence upon the magnitude of a phase difference between the asynchronous and synchronized data signals in comparison to respective threshold values; and means for cyclically changing at least one of said phase difference and said threshold values thereby to produce additional stuff requests in the positive and negative stuff request signals, whereby the frequency of jitter, due to stuffing, in the synchronized data signal is increased.

Conveniently the means for cyclically changing at least one of said phase difference and said threshold values comprises means for generating a cyclical waveform having a progressively changing level at least during part of each cycle, and means for changing at least one of said phase difference signal and said threshold of values in dependence upon said waveform.

The means for generating a cyclical waveform preferably comprises a sawtooth waveform generator, and may comprise a counter, in which case means may be provided for supplying to the counter a clock signal which is related to the timing of one of the data signals.

The invention will be further understood from the following description with reference to the accompanying drawings, in which.

Similar references are used throughout the drawings for corresponding elements in the different figures.

Figure 1:
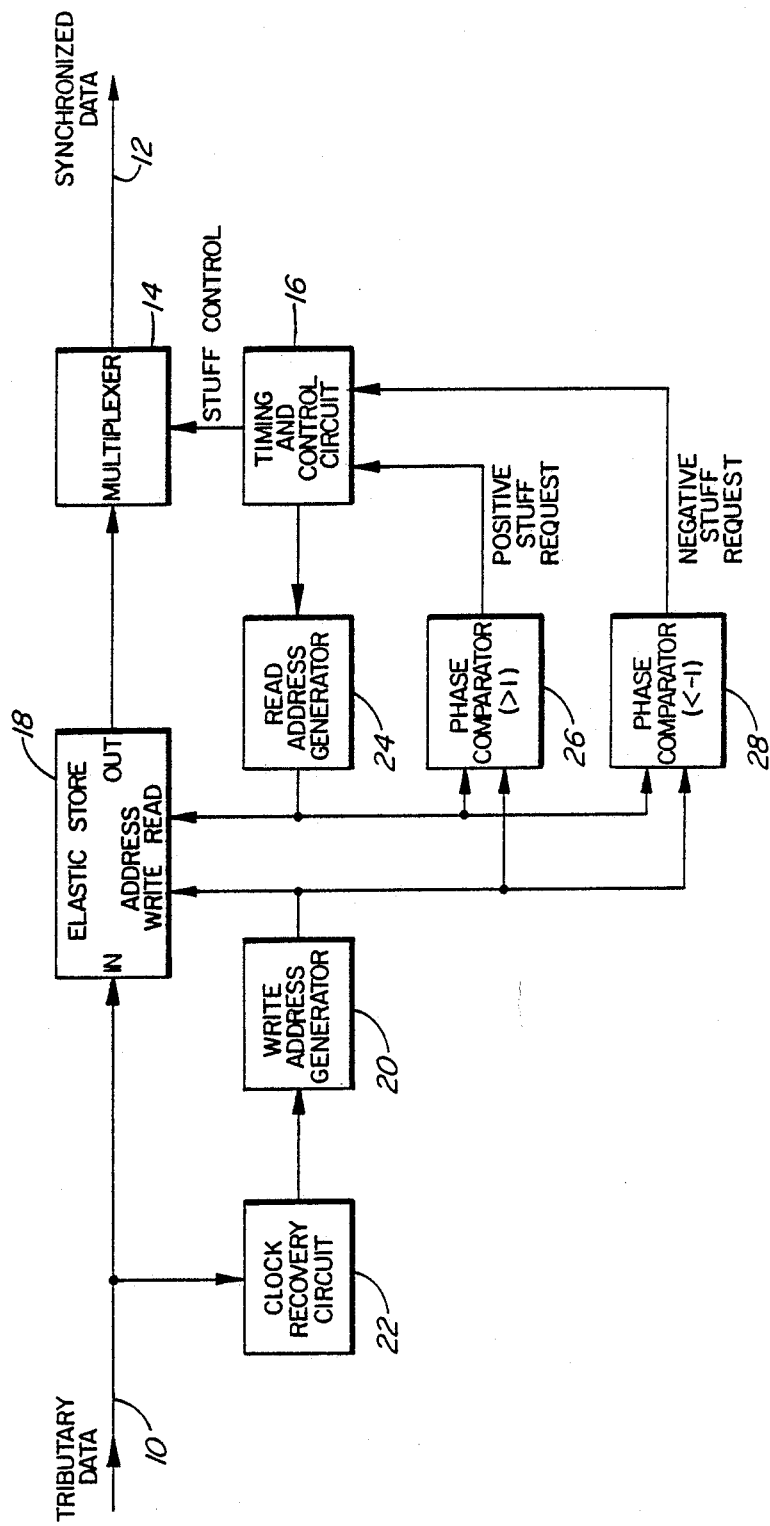
FIG. 1 is a block diagram illustrating a known synchronizing arrangement.

Referring to FIG. 1, a known form of synchronizing arrangement is illustrated for converting an asynchronous serial digital bit stream, referred to as tributary data and incoming on a line 10, into a locally synchronized serial digital bit stream, referred to as synchronized data, on a line 12. Synchronization is effected using positive and/or negative stuffing in a multiplexer 14 under the control of stuff control signals supplied to the multiplexer 14 by a timing and control circuit 16.

The tributary data bits are written into a cyclic store 18, generally referred to as an elastic store, at an address supplied by a write address generator 20 supplied with a recovered clock signal produced by a clock recovery circuit 22 from the tributary data bit stream, and are read from the store 18 to the multiplexer 14 under the control of a read address generator 24 supplied with a local clock signal from the circuit 16. In order to determine when positive or negative stuffing is necessary to establish or maintain synchronization of the data on the line 12, the relative phases of the write and read addresses produced by the generators 20 and 24 are compared in phase comparators 26 and 28 to produce, when necessary, a positive or negative stuff request signal respectively. The stuff request signals are supplied to the circuit 16 which controls the multiplexer 14 to effect the desired stuffing at the next stuffing opportunity, the clock signal supplied by the circuit 16 to the read address generator 24 being gapped accordingly.

More particularly, the elastic store 18 may be an 8-bit store, with the write and read addresses cyclically addressing these 8 locations with an offset of 4 bits between the write and read addresses corresponding to a zero stuffing situation. If the asynchronous incoming tributary data has a slightly lower frequency than the synchronized data, then this offset will increase by one or more bits with the result that the phase comparator 26 produces a positive stuff request, in response to which a positive stuff reduces the offset between the write and read addresses by one bit. Conversely, if the asynchronous tributary data frequency is lower than that of the synchronized data, the offset decreases by one or more bits and the phase comparator 28 produces a negative stuff request which when satisfied increases the offset by one bit.

Such a synchronizing arrangement produces in the data signal a jitter component, generally referred to as waiting time jitter, with a frequency which is equal to the nominal rate of positive or negative stuffing. For example, if the tributary data is an asynchronous DS1 bit stream having a nominal bit rate of 1.544Mb/s and an actual bit rate which may be up to 75b/s more or less than this, then the jitter component will have a frequency in the range from 0 to 75Hz. The closer the asynchronous bit stream rate is to the nominal rate, the lower the frequency of the jitter component.

In a receiver to which the bit stream is ultimately transmitted, a dejittering phase locked loop (PLL) is provided to reduce jitter, but this generally has a lower cut-off frequency of at least about 50Hz so that most jitter due to stuffing is not attenuated by this PLL. This gives rise to a significant problem in the handling of asynchronous digital bit streams in synchronous networks such as SYNTRAN and SONET. The cut-off frequency of the receiver PLL can not be substantially reduced to avoid the problem because this would unacceptably increase the acquisition time of the PLL and elastic storage requirements, and in any event this cut-off frequency would have to be reduced to 0 to handle all possible jitter frequency components.

Figure 2:
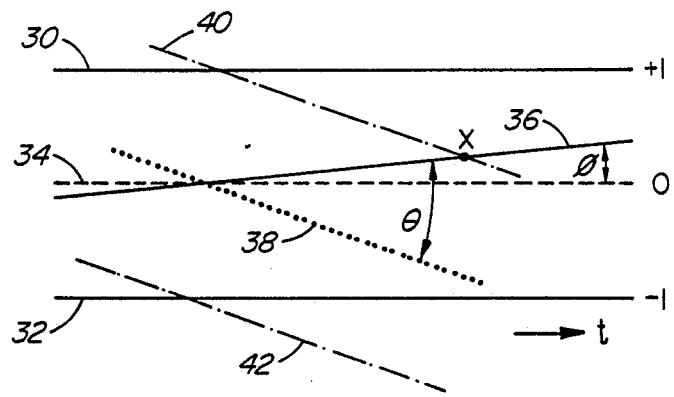
FIG. 2 is a diagram illustrating phase relationships and their modification in accordance with the principles of this invention.

FIG. 2 illustrates diagramatically as a function of time t the phase relationships which give rise to the jitter discussed above. In FIG. 2, horizontal lines 30 and 32 represent the plus and minus one bit phase differences, or stuffing threshold levels, to which the phase comparators 26 and 28, respectively, respond to produce the respective stuff request signals. A horizontal broken line 34 represents the phase of a perfectly synchronized data signal, which would never require positive or negative stuffing because the line 34 is parallel to, and cannot intersect, either of the stuffing threshold lines 30 and 32.

A line 36 represents the phase of an asynchronous tributary data signal, this line sloping at an angle $\phi$ with respect to the line 34. The angle $\phi$ is proportional to the difference in the frequencies of the asynchronous and synchronized data signals, and hence to the rate of stuffing which is necessary for synchronization of the asynchronous data signal. It can be seen that the line 36 will, because of its slope, intersect the stuffing threshold line 30 or 32 (depending on the sign of the angle $\phi$, i.e. whether the asynchronous data signal frequency is less than or greater than the synchronized data signal frequency) whereupon the respective phase comparator 26 or 28 produces a stuff request signal, in response to which a stuff is performed to produce a step in the line 36 bringing it closer to the line 34.

It can be seen from the explanation above that the jitter frequency, which is equal to the rate of stuffing, is a function of the slope of the line 36, or the angle $\phi$. As the slope or angle $\phi$ is increased, stuffing requests occur more frequently and the jitt frequency is accordingly higher. If the jitter frequency is increased to above the lower cut-off frequency of the dejitterizing PLL, then the jitter will be attenuated and effectively removed by this PLL, which already exists in the receiver circuitry for which accordingly no modification is necessary.

It may be thought that merely by forcing additional positive or negative fixed stuffs, the rate of stuffing would be increased sufficiently to raise the jitter frequency in the desired manner. For example, for a DS1 data tributary with a frame rate of 8 kHz and a stuff opportunity in alternate frames there are 4000 stuffing opportunities per second. If a fixed positive stuff were forced at every eighth stuffing opportunity, this would provide a fixed positive stuffing rate at a frequency of 500 Hz, well above the lower cut-off frequency of the dejitterizing PLL.

In practice, however, it has been found that this technique, rather than removing the jitter components to a center frequency of 500 Hz for removal by the PLL, is additive so that it merely adds jitter at 500Hz, which is removed by the PLL, to the original low frequency jitter which remains unattenuated by the PLL.

This invention, instead, acts to increase the effective slope of the line 36, from the angle $\phi$ to an angle $\theta$ in FIG. 2. This increased slope angle $\theta$ is the angle between the line 36 and a dotted line 38 in FIG. 2. The line 38 corresponds to the zero-phase-error line 34 but is artificially rotated with respect thereto through an angle $\theta$-$\phi$. One of the correspondingly rotated plus and minus 1 bit stuffing threshold level lines 40 and 42, shown as chained lines and parallel to the line 38, it now intersected by the line 36, at a point X as illustrated in FIG. 2, much sooner than the corresponding line 30 would have been. In this manner, the jitter frequency is increased in a non-additive manner to a frequency above the lower cut-off frequency of the PLL whereby the jitter is removed.

In considering FIG. 2, and likewise FIGS. 3 to 5 described below, it should be appreciated that the vertical direction represents relative phase, or alternatively a digital or analog value representative of phase. In particular, relative to the zero relative phase line 34 the lines 30 and 32 represent phase changes of respectively plus and minus one bit, and hence digital threshold levels of plus and minus one unit; the phase comparators 26 and 28 in FIG. 1 can thus conveniently be digital comparators, such as subtractors responsive to the difference between the digital addresses produced by the write and read address generators 20 and 24. In contrast, the threshold level lines 40 and 42 do not generally have integer digital values, so that phase comparison with respect to these changing threshold levels dictates the use of analog phase comparators, or digital comparators having a resolution which is a fraction of a one-bit phase difference.

Obviously in a practical synchronizing arrangement the phase comparator stuffing threshold levels 40 and 42 can not change continuously in the same direction as in the explanatory illustration in FIG. 2. Instead, these changing threshold levels are constituted by cyclically changing signal levels, conveniently (but not necessarily) of a predetermined waveform, frequency, and amplitude. Three possible waveforms are illustrated in FIGS. 3 to 5, but these are given only by way of example and actual waveforms used may vary widely from these. Furthermore, the upper and lower threshold waveforms need not have the same frequency, phase, amplitude, or shape as one another, and rather than being analog waveforms these may be digitized, stepped (e.g. staircase) waveforms. The only essential requirement of the waveforms appears to be that they must provide, at least during part of a cycle, a progressively changing (smoothly as in an analog signal or stepped as in a digitized signal) threshold level. Thus a square waveform, which has not such gradually changing portion, is ineffective. The effectiveness of any particular waveform can be determined by supplying a non-synchronized tributary data signal to the synchronization arrangement and examining the spectral content of the resulting synchronized data signal to determine whether or not the low frequency jitter component has been removed (or, more accurately, has been shifted to higher frequencies to be filtered out by the dejitterizing PLL).

Figure 3:
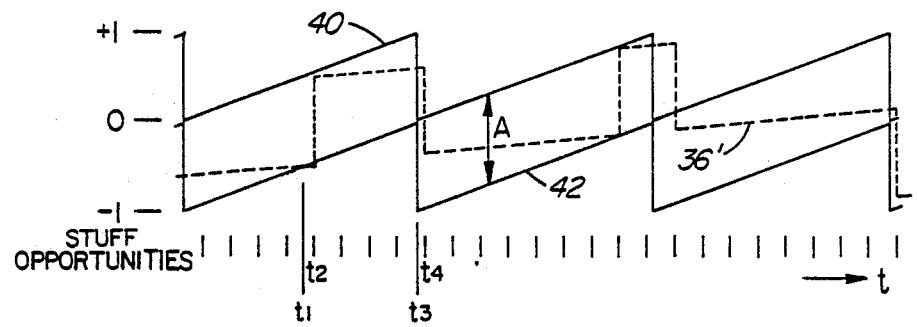
FIG. 3 is a diagram illustrating thresholds for phase comparisons used in an embodiment of this invention.

One particular embodiment of the invention is described below with reference to FIG. 3, illustrating the waveforms of upper and lower threshold levels which are used, FIG. 6, which shows a block diagram of a synchronizing arrangement, and FIG. 7, which is an explanatory waveform diagram.

Referring to FIG. 3, each of the upper and lower stuffing threshold levels 40 and 42 respectively has the form of a sawtooth waveform, the upper threshold level 40 varying between amplitudes corresponding to relative phases of zero and one bit, and the lower threshold level 42 varying between amplitudes corresponding to relative phases of minus one bit and zero. As illustrated in Fig. 6, these threshold levels 40 and 42 are produced at the outputs of respective summing amplifiers 44 and 46 respectively from a single triangular waveform produced by a waveform generator 48. The generator 47 may be free-running or it may be driven from timing signals related to the data signals, and it may be an analog waveform generator or a digital waveform generator which generates a staircase waveform approximating the sawtooth waveform shown in Fig. 3.

The frequency of the waveform generated by the generator 48 is selected to provide a desirable frequency shift of the waiting time jitter and also, in accordance with known principles, to provide a desirable stuff ratio for low jitter power. For example for a DS1 data tributary, as already described the waiting time jitter has a frequency in the range from zero to 75 Ha; this is frequency shifted by the sawtooth waveform frequency to a frequency which is desired to be well above the lower cut-off frequency of the dejitterizing PLL, so that the sawtooth waveform frequency is desirably at least about 200 Hz (a period of not more than about 5ms). It is also desirable for a plurality of stuffing opportunities to occur during each period of the sawtooth waveform, which for one stuffing opportunity in alternate DS1 frames implies an upper frequency limit for the sawtooth waveform of about 2000 Hz. Thus in each period of the sawtooth waveform there may be a number N from about 4 to about 40 DS1 frames (not necessarily synchronized or an integral number). By way of example, computer simulations with N=17 and N=27 have demonstrated effective jitter reduction.

Figure 6:
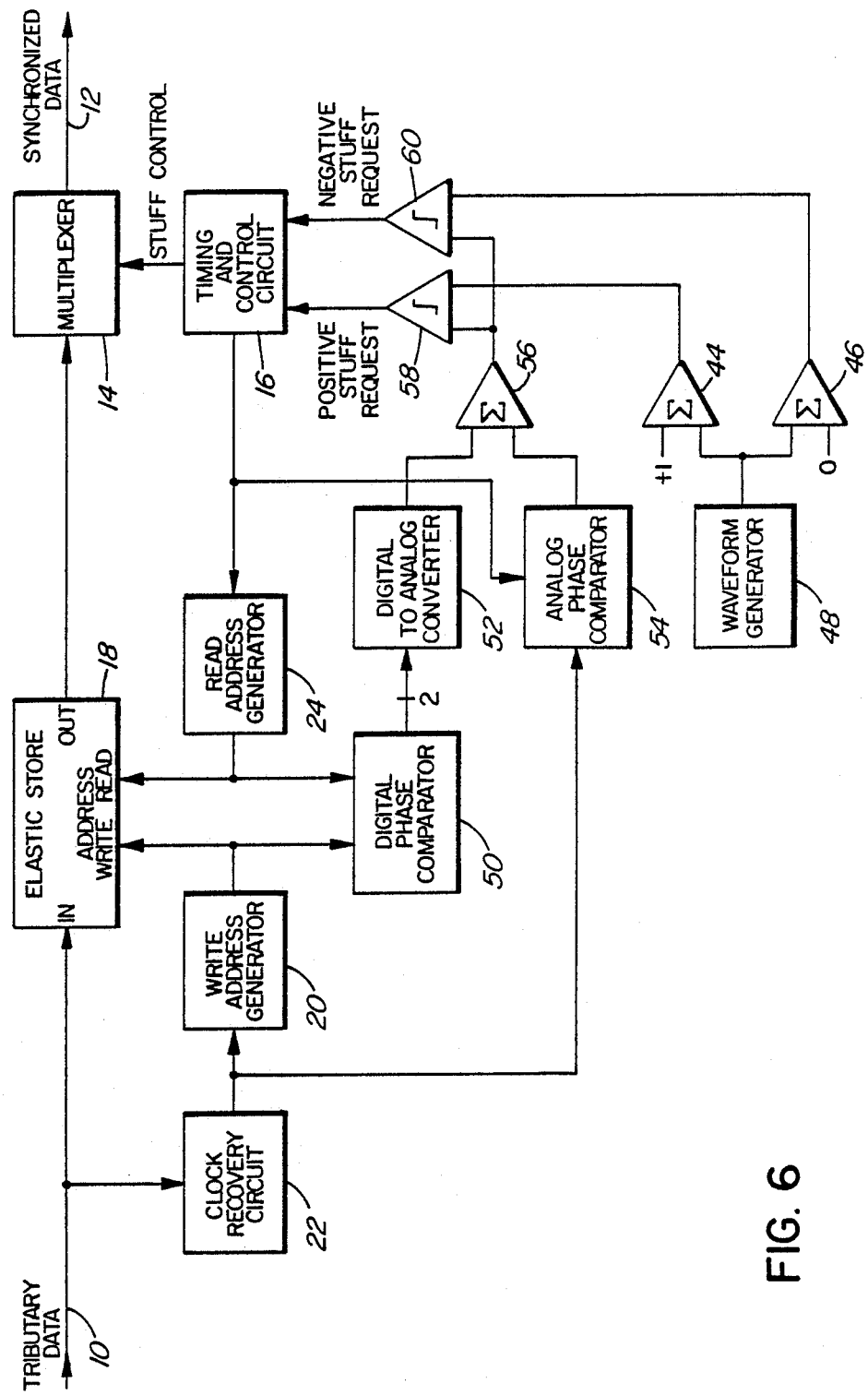
FIG. 6 is a block diagram illustrating a synchronizing arrangement in accordance with an embodiment of this invention.
Figure 7:
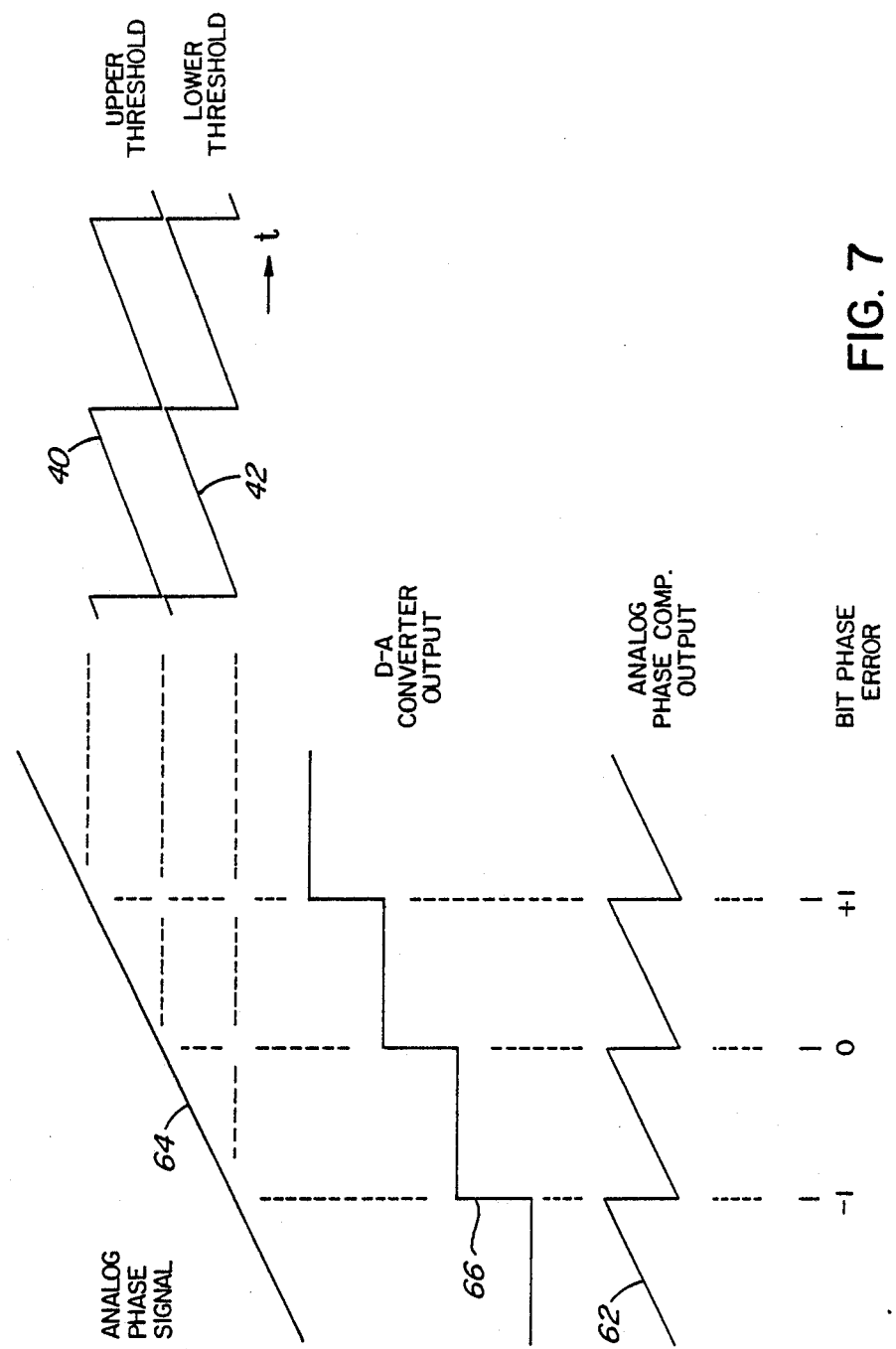
FIG. 7 is a waveform diagram with reference to which the operation of the synchronizing arrangement of FIG. 6 is explained.

In place of the phase comparators 26 and 28 (with implicit threshold level comparators) in the arrangement of FIG. 1, in the arrangement of FIG. 6 an analog phase signal is produced by a digital phase comparator 50, digital-to-analog converter 52, analog phase comparator 54, and summing amplifier 56 in combination, and is compared with the upper and lower threshold levels 40 and 42 by comparators 58 and 60 respectively which produce respectively the positive and negative stuff request signals which are supplied to the timing and control circuit 16. Otherwise, the arrangement of FIG. 6 is the same as that in FIG. 1.

The operation of the elements 50 to 56 is described below with additional reference to FIG. 7, which illustrates phase-related signals on its left-hand side and repeats the threshold waveforms of FIG. 3 on its right-hand side.

The analog phase detector 54 is responsive to phase differences between the clock signals supplied to the write and read address generators 20 and 24 to generate an output signal 62 whose amplitude is proportional to the phase difference between the two clock signals. As the analog phase comparator can not distinguish between two clock signals which are a complete clock cycle (360°) out of phase, the signal 62, illustrated in FIG. 7 as a function of bits of phase error, periodically repeats itself in successive bit intervals. This ambiguity is resolved by the elements 50, 52, and 56 to produce the analog phase signal, 64 in FIG. 7, at the output of the summing amplifier 56. The digital phase comparator 50 produces a 2-bit output which represents in which one of four bit intervals the phase error between the write and read addresses is. This 2-bit output is converted by the converter 52 into a signal 66, which as a function of bit phase error has a staircase form as shown in FIG. 7, which is added to the signal 62 by the summing amplifier 56 to produce the analog phase signal 64, which as shown in FIG. 7 is linearly proportional to the phase error over the operating range of interest.

In the comparators 58 and 60, the analog phase signal 64 prevailing at any instant of time is compared with the current threshold levels, thereby producing a positive or negative stuff request if the analog phase signal is respectively greater than the current upper threshold level or less than (i.e. more negative than) the current lower threshold level.

Referring again to FIG. 3, the result of this synchronizing arrangement is shown by a broken line 36' which represents the analog phase signal for an asynchronous data signal having the same asynchronous frequency (i.e. the same slope with respect to time) as shown by the line 36 in FIG. 2. FIG. 3 also represents by vertical lines the stuff opportunities, or times at which a positive or negative stuff can take place in response to a stuff request signal.

As shown in FIG. 3, at a time t1 the line 36' crosses the lower threshold 42, in response to which a negative stuff request signal is produced and a negative stuff is effected at the next stuff opportunity at a time t2. At a time t3 the line 36' crosses the upper threshold 40, producing a positive stuff request signal and a consequent positive stuff at the next stuff opportunity at a time t4. This process continues as illustrated in FIG. 3, with a greatly increased stuffing rate compared with that which occurs in the prior art, and a consequent up-shifting of the frequency of the jitter whereby it is effectively removed by the dejitterizing PLL.

The dramatic improvement in jitter reduction achieved by a synchronizing arrangement in accordance with the invention can be seen from a comparison of its jitter performance with that of the prior art. With an asynchronous DS1 tributary data stream having a 50Hz frequency offset with respect to the synchronized data frequency, the prior art synchronizing arrangement of FIG. 1 produced an rms jitter component, for frequencies up to 200 Hz, of 0.3 of a clock cycle or bit period. With the synchronizing arrangement of FIG. 6, the rms jitter component for frequencies up to 200 Hz was reduced to 0.005 of a clock cycle with N=27 and to 0.003 of a clock cycle with N=17. Thus synchronizing arrangements in accordance with the invention have provided jitter improvements of up to 2 orders of magnitude in comparison to the prior art.

Figure 4:
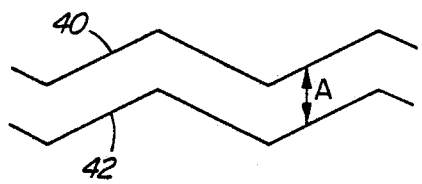
FIGS. 4 and 5 illustrate alternative forms of the thresholds of FIG. 3.
Figure 5:
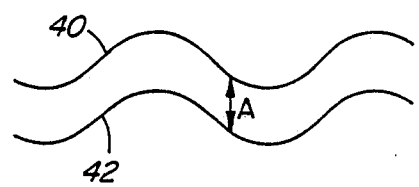

FIGS. 4 and 5 illustrates alternative waveforms, specifically triangular and sinusoidal waveforms, which may be generated by the waveform generator 48 and used in place of the sawtooth threshold level waveforms of FIG. 3. Again for convenience of their generation these are shown with the upper and lower threshold levels changing in the same manner and with the same phase and amplitude as one another, but this need not necessarily be the case. With all of the waveforms for the threshold levels 40 and 42 in FIGS. 3, 4, and 5, it has been found desirable for systems with limited overhead and fixed stuffing for the amplitude difference A between the thresholds to be equivalent to a phase difference of about one clock cycle or bit period (i.e. a 360° phase change). This difference A can, however, be varied to provide an optimum performance for any particular system. In particular, for a SONET STS-1 data signal which uses byte stuffing as described below, better performance has been obtained with this difference A being equal to about two clock cycles or bytes (720° phase difference).

Figure 8:
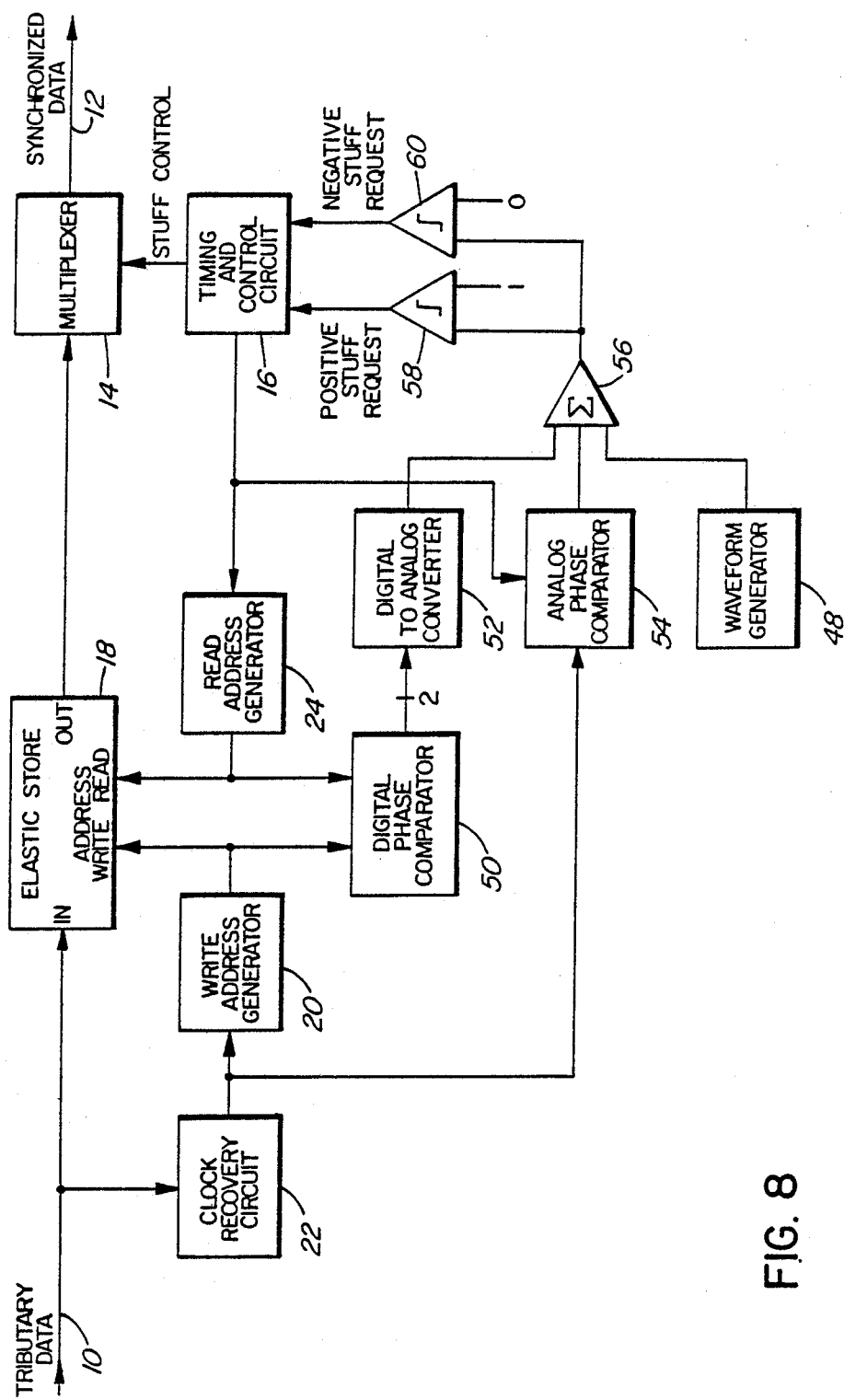
FIG. 8 is a block diagram illustrating a modification of the synchronizing arrangement of FIG. 6.

FIG. 8 illustrates a modified form of the synchronizing arrangement of FIG. 6, in which the summing amplifiers 44 and 46 are dispensed with, the output of the waveform generator 48 is supplied to a further input of the summing amplifier 56, and the output of the summing amplifier 56 is compared by the comparators 58 and 60 with fixed threshold levels. Thus whereas in the arrangement of FIG. 6 the generated waveform is used to modify the threshold levels, in the arrangement of FIG. 8 the threshold levels are fixed and the signal amplitude representing the detected phase difference is modified by the generated waveform, with a directly equivalent result. Except for this modification, the arrangement of FIG. 8 is the same as that of FIG. 6, and it provides equivalent results.

As already indicated, the synchronizing arrangements of FIGS. 6 and 8 use an analog phase comparator 54 to detect phase differences which are a fraction of a bit period. The need for an analog phase comparator can be avoided by the use of higher-frequency clock signals, divided in frequency for driving the address generators 20 and 24, and a digital phase comparator (which may be combined with the digital phase comparator 50) which is capable of detecting fractional-bit phase differences. A similar arrangement can be used in respect of a byte-stuffing synchronizing arrangement, as described below with reference to FIG. 9, as compared to the bit-stuffing arrangements which have been described above.

Figure 9:
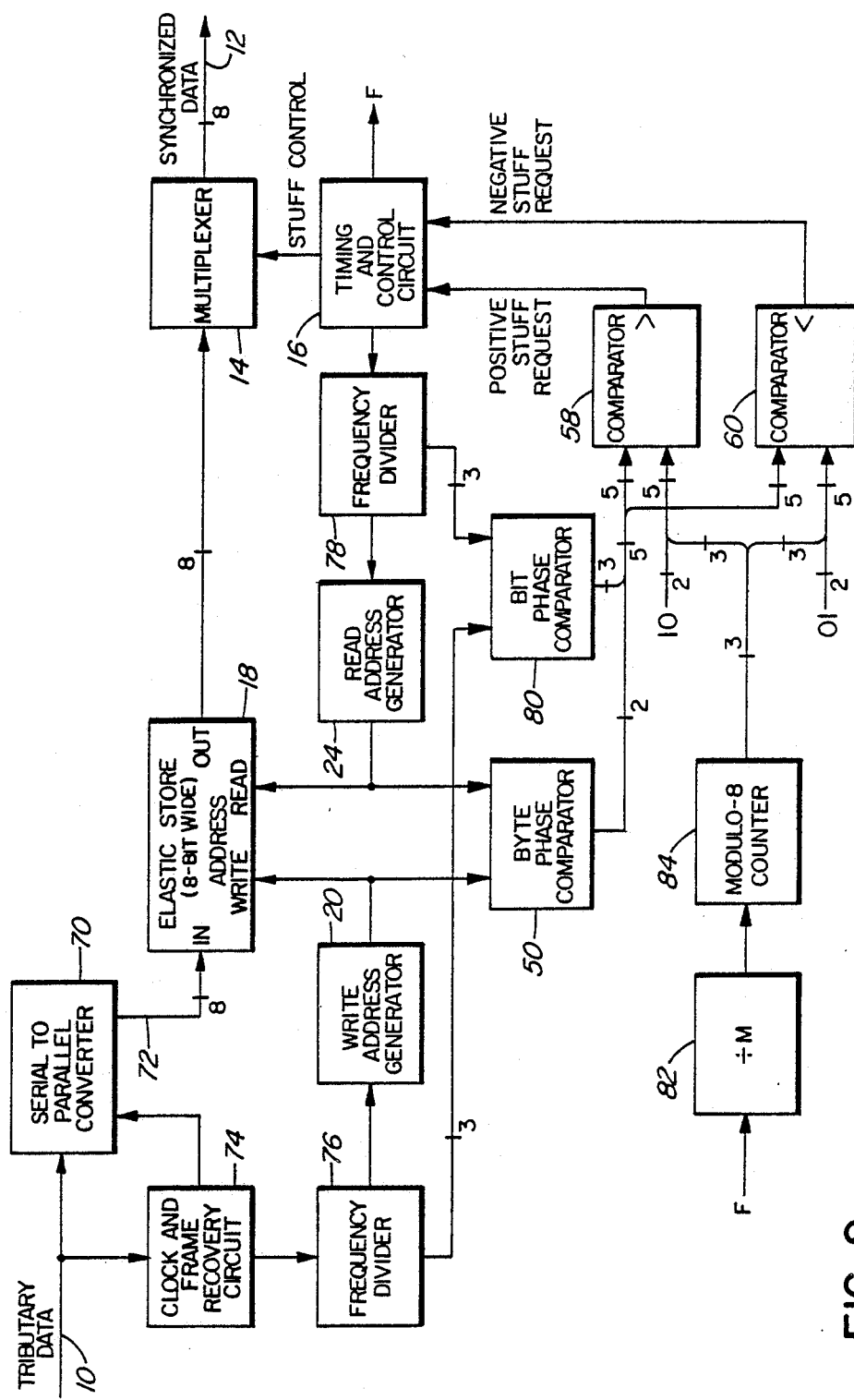
FIG. 9 is a block diagram illustrating a synchronizing arrangement in accordance with another embodiment of this invention.

Referring to FIG. 9, in a byte-stuffing synchronizing arrangement stuffing is effected one byte (assumed here to be 8 bits) at a time. Accordingly the elastic store 18 serves to store bytes rather than bits, and is preceded by a serial to parallel converter 70 which converts the asynchronous bit-serial incoming tributary data on the line 10 into 8-bit wide parallel data on a line 72, under the control of a clock and frame recovery circuit 74 of conventional form. Similarly, the multiplexer 14 operates on 8-bit wide bytes of data.

The write and read address generators 20 and 24 are now driven at the byte rate via frequency dividers 76 and 78 respectively driven by the circuits 74 and 16 respectively. The digital phase comparator 50 now serves as a byte phase comparator providing a 2-bit output, as before, which is retained in digital form. The analog phase comparator 54 is replaced by a digital bit phase comparator 80 which compares the relative (fractional-byte) phases of the frequency dividers 76 and 78 (which may be constituted by 3-stage counters) to provide a 3-bit output.

The timing and control circuit 16 also produces a signal F which is frequency divided by M in a frequency divider 82 to provide a clock signal at a desired rate for a modulo-8 counter 84 which corresponds to the waveform generator 48. The 3-bit output of the counter 84 constitutes a changing digital value, just as the output of the waveform generator 48 is a changing analog value. The value M is selected in accordance with the frequency of the signal F to provide a suitable frequency of this changing digital value in accordance with the principles already described. The signal F, or the input to the modulo-8 counter 84, could alternatively be independently produced, or it could be derived from the incoming tributary data on the line 10 or from the circuit 74 to provide the possibility of adaptive control of the waveform or digital value generation.

The comparators 58 and 60 are now constituted by 5-bit digital comparators which compare the 5-bit combined phase difference constituted by the outputs of the phase comparators 50 and 80 with 5-bit upper and lower threshold stuffing levels constituted by a 2-bit fixed digital value combined with the changing 3-but output of the counter 84, to produce positive or negative stuff requests accordingly. The 2-bit fixed digital values shown by way of example in FIG. 9 correspond to a difference between the thresholds 35 representing a phase difference of 360°, and may be changed, in particular to correspond to a threshold phase difference of 720° as already mentioned above, for best performance in particular circumstances.

Thus the synchronizing arrangement of FIG. 9, operating in an entirely digital manner, corresponds directly to the analog arrangement of FIG. 6.

Although not illustrated in FIG. 9 for the sake of clarity and simplicity, the timing and frequency division circuitry may include means for accommodating stuffing of other than whole bytes and/or the handling of a tributary data stream which is framed in frames each containing a non-integral number of bytes, by suitable gapping of clock signals and modification of frequency division factors using known techniques. In particular, it is observed that the tributary data may be a DS1 signal having 193 bits per frame, with the 193rd, or frame synchronizing, bit stuffed by an additional 7 bits to produce byte-synchronized data, the 7-out-of-8 bit stuffing being effected by the synchronizing arrangement in the manner described above to achieve low jitter.

Although particular embodiments of the invention and variations thereof have been described in detail, it should be appreciated that numerous other modifications, variations, and adaptations may be made without departing from the scope of the invention as defined in the claims.

What is claimed is:

1. A method of synchronizing an asynchronous signal to produce a synchronized signal by stuffing the asynchronous signal in dependence upon a stuff request signal produced from a comparison of phases of the asynchronous and synchronized signals, wherein the stuff request signal is produced with additional stuff requests thereby to change the frequency spectrum of jitter in the synchronized signal.

2. A method as claimed in claim 1 wherein the frequency spectrum is changed to increase the frequency of jitter in the synchronized signal.

3. A method of synchronizing an asynchronous data signal to produce a synchronized data signal comprising the steps of:
   stuffing the asynchronous data signal in dependence upon a stuff request signal to produce the synchronized data signal;
   producing the stuff request signal in dependence upon the relative phases of the asynchronous and synchronized data signals; and
   modifying the production of the stuff request signal to include additional stuff requests therein, whereby the frequency of jitter, due to stuffing, in the synchronized data signal is increased.

4. A method as claimed in claim 3 wherein the stuff request signal is produced in dependence upon the magnitude of a phase difference between the asynchronous and synchronized data signals in comparison to at least one threshold value, and wherein the step of modifying the production of the stuff request signal comprises the step of changing at least one of said phase difference and said threshold value.

5. A method as claimed in claim 4 wherein said at least one of said phase difference and said threshold value is changed cyclically.

6. A method as claimed in claim 4 wherein said at least one of said phase difference and said threshold value is changed cyclically and periodically with a period during which a plurality of stuffs of the asynchronous data signal can be effected.

7. A method as claimed in claim 6 wherein said period is not more than about 5 ms.

8. A method as claimed in claim 6 wherein said at least one of said phase difference and said threshold value is changed cyclically with a predetermined waveform having a progressively changing level at least during part of each cycle.

9. A method as claimed in claim 8 wherein said waveform is a substantially sawtooth waveform.

10. A method as claimed in claim 8 wherein said waveform is a substantially triangular waveform.

11. A method as claimed in claim 8 wherein said waveform is a substantially sinusoidal waveform.

12. A method as claimed in claim 8 wherein said phase difference and said threshold value are digital quantities and said waveform is constituted by a changing count of a counter.

13. A method as claimed in claim 12 wherein said threshold value is changed cyclically in dependence upon said count.

14. A method of synchronizing an asynchronous data signal to produce a synchronized data signal comprising the steps of:
    stuffing the asynchronous data signal in dependence upon positive and negative stuff request signals to produce the synchronized data signal;
    producing the positive and negative stuff request signals in dependence upon the magnitude of a phase difference between the asynchronous and synchronized data signals in comparison to respective threshold values; and
    cyclically changing at least one of said phase difference and said threshold values thereby to produce additional stuff requests in the positive and negative stuff request signals, whereby the frequency of jitter, due to stuffing, in the synchronized data signal is increased.

15. A method as claimed in claim 14 wherein said at least one of said phase difference and said threshold values is cyclically changed periodically with a period during which a plurality of stuffs of the asynchronous data signal can be effected.

16. A method as claimed in claim 15 wherein said period is not more than about 5 ms.

17. A method as claimed in claim 15 wherein said at least one of said phase difference and said threshold values is changed cyclically with a predetermined waveform having a progressively changing level at least during part of each cycle.

18. A method as claimed in claim 17 wherein said waveform is a substantially sawtooth waveform.

19. A method as claimed in claim 17 wherein said waveform is a substantially triangular waveform.

20. A method as claimed in claim 17 wherein said waveform is a substantially sinusoidal waveform.

21. A method as claimed in claim 17 wherein said phase difference and said threshold values are digital quantities and said waveform is constituted by a changing count of a counter.

22. A method as claimed in claim 14 wherein said threshold values differ by, and said cyclical change has an amplitude of, an amount corresponding to a phase difference of about 360°.

23. A method as claimed in claim 15 wherein said threshold values differ by, and said cyclical change has an amplitude of, an amount corresponding to a phase difference of about 360°.

24. A method as claimed in claim 17 wherein said threshold values differ by, and said cyclical change has an amplitude of, and amount corresponding to a phase difference of about 360°.

25. A method as claimed in claim 21 wherein said threshold values differ by, and said cyclical change has an amplitude of, an amount corresponding to a phase difference of about 360°.

26. A method as claimed in claim 14 wherein said threshold value differ by an amount corresponding to a phase difference of about 720°.

27. A method as claimed in claim 15 wherein said threshold values differ by an amount corresponding to a phase difference of about 720°.

28. A method as claimed in claim 17 wherein said threshold values differ by an amount corresponding to a phase difference of about 720°.

29. A method as claimed in claim 21 wherein said threshold values differ by an amount corresponding to a phase difference of about 720°.

30. Synchronizing apparatus comprising:
    means responsive to a stuff request signal for stuffing an asynchronous data signal to produce a synchronized data signal;
    means for producing the stuff request in a dependence upon the relative phases of the asynchronous and synchronized data signals; and
    modifying means for modifying the production of the stuff request signal to include additional stuff requests thereby to increase the frequency of jitter, due to stuffing, in the synchronized data signal.

31. Apparatus as claimed in claim 30 wherein the means for producing the stuff request signal comprises phase comparison means, for comparing the relative phases of the asynchronous and synchronized data signals to produce a phase difference signal, and means for comparing the phase difference signal with at least one threshold value to produce the stuff request signal, and the modifying means comprises means for changing at least one of said phase difference signal and said threshold value.

32. Apparatus as claimed in claim 31 wherein the modifying means comprises means for generating a cyclical waveform having a progressively changing level at least during part of each cycle, and means for changing at least one of said phase difference signal and said threshold value in dependence upon said waveform.

33. Apparatus as claimed in claim 31 wherein the phase difference signal and the threshold value are digital quantities and the means for generating a cyclical waveform comprises a counter.

34. Synchronizing apparatus comprising:
    means responsive to positive and negative stuff request signals for stuffing an asynchronous data signal to produce a synchronized data signal;
    means for producing the positive and negative stuff request signals in dependence upon the magnitude of a phase difference between the asynchronous and synchronized data signals in comparison to respective threshold values; and
    means for cyclically changing at least one of said phase difference and said threshold values thereby to produce additional stuff requests in the positive and negative stuff request signals, whereby the frequency of jitter, due to stuffing, in the synchronized data signal is increased.

35. Apparatus as claimed in claim 34 wherein the means for cyclically changing at least one of said phase difference and said threshold values comprises means for generating a cyclical waveform having a progressively changing level at least during part of each cycle, and means for changing at least one of said phase difference signal and said threshold values in dependence upon said waveform.

36. Apparatus as claimed in claim 35 wherein the means for generating a cyclical waveform comprises a sawtooth waveform generator.

37. Apparatus as claimed in claim 35 wherein the waveform generator comprises a counter.

38. Apparatus as claimed in claim 37 and including means for supplying to the counter a clock signal which is related to the timing of one of the data signals.

39. A method of synchronizing an asynchronous data signal to produce a synchronized data signal, comprising the steps of:
stuffing the asynchronous data signal in dependence upon a stuff request signal to produce the synchronized data signal;
producing the stuff request signal in dependence upon the magnitude of a phase difference between the asynchronous and synchronized data signals in comparison to at least one threshold value; and
modifying the production of the stuff request signal in dependence upon said comparison to increase the frequency of jitter, due to stuffing, in the synchronized data signal.

40. A method as claimed in claim 39 wherein the production of the stuff request signal is modified cyclically and periodically with a period during which a plurality of stuffs of the asynchronous data signal can be effected.

41. A method as claimed in claim 40 wherein said period is not more than about 5 ms.

42. A method as claimed in claim 39 wherein the step of modifying the production of the stuff request signal comprises cyclically varying the threshold value with a predetermined waveform having a progressively changing level at least during part of each cycle.

43. A method as claimed in claim 42 wherein the phase difference magnitude and the threshold value are digital quantities and the waveform is constituted by a changing count of a counter.

44. A method as claimed in claim 39 wherein the asynchronous data signal is stuffed using positive and negative stuffing in dependence upon positive and negative stuff request signals to produce the synchronized data signal, the positive and negative stuff request signals are produced in dependence upon the magnitude of the phase difference between the asynchronous and synchronized data signals in comparison in respective threshold values, and the production of the positive and negative stuff request signals in dependence upon the respective comparisons in modified to produce additional stuff requests in the positive and negative stuff request signals.

45. A method as claimed in claim 44 wherein the production of the positive and negative stuff request signals is modified by varying said respective threshold values.

46. Synchronizing apparatus comprising:
stuffing means responsive to a stuff request signal for stuffing an asynchronous data signal to produce a synchronized data signal;
means for producing the stuff request signal in dependence upon the relative phases of the asynchronous and synchronized data signals in comparison to at least one threshold value; and
means for varying the threshold value whereby the frequency of jitter, due to stuffing, in the synchronized data is increased.

47. Apparatus as claimed in claim 46 wherein the means for varying the threshold value comprises means for generating a cyclical waveform having a progressively changing level at least during part of each cycle, and means for changing the threshold value in dependence upon said waveform.

48. Apparatus as claimed in claim 47 wherein the threshold value is a digital quantity and the means for generating a cyclical waveform comprises a counter.

* * * * *